United States Patent
Sibbach et al.

(10) Patent No.: US 12,338,837 B2
(45) Date of Patent: Jun. 24, 2025

(54) TURBOFAN ENGINE HAVING ANGLED INLET PRE-SWIRL VANES

(71) Applicant: General Electric Company, Schenectady, NY (US)

(72) Inventors: Arthur William Sibbach, Oxford, MA (US); Brandon Wayne Miller, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/755,054

(22) Filed: Jun. 26, 2024

(65) Prior Publication Data

US 2024/0344530 A1 Oct. 17, 2024

Related U.S. Application Data

(62) Division of application No. 17/676,454, filed on Feb. 21, 2022, now abandoned.

(51) Int. Cl.
*F04D 29/66* (2006.01)
*F01D 9/04* (2006.01)
(Continued)

(52) U.S. Cl.
CPC ............. *F04D 29/66* (2013.01); *F01D 9/041* (2013.01); *F01D 25/24* (2013.01); *F02C 7/045* (2013.01);
(Continued)

(58) Field of Classification Search
CPC ........ F04D 29/66; F04D 29/54; F04D 29/544; F04D 29/663; F01D 9/041; F01D 25/24;
(Continued)

(56) References Cited

U.S. PATENT DOCUMENTS 3,540,682 A 11/1970 Dibble et al.
3,618,876 A 11/1971 Skidmore
(Continued)

FOREIGN PATENT DOCUMENTS

CN 101922312 12/2010
GB 2403778 A 1/2005

OTHER PUBLICATIONS

Willis, Quiet Clean Short-haul Experimental Engine (QCSEE) Final Report, NASA-CR-159473, Aug. 1979, 312 Pages.

*Primary Examiner* — Brian Christopher Delrue
(74) *Attorney, Agent, or Firm* — Dority & Manning, P.A.

(57) ABSTRACT

A turbofan engine is provided. The turbofan engine includes a fan having a plurality of fan blades; a turbomachine operably coupled to the fan for driving the fan, the turbomachine having a compressor section, a combustion section, and a turbine section in serial flow order and together defining a core air flowpath; a nacelle surrounding and at least partially enclosing the fan, the nacelle defining a radius and a longitudinal axis; and an inlet pre-swirl vane located upstream of the plurality of fan blades and defining a chord, the inlet pre-swirl vane coupled to the nacelle, wherein the inlet pre-swirl vane is angled at a first angle with respect to the radius of the nacelle, and wherein the chord of the inlet pre-swirl vane is angled at a second angle with respect to the longitudinal axis of the nacelle.

20 Claims, 9 Drawing Sheets

(51) Int. Cl.
*F01D 25/24* (2006.01)
*F02C 7/045* (2006.01)
*F04D 29/54* (2006.01)

(52) U.S. Cl.
CPC ............ *F04D 29/54* (2013.01); *F04D 29/663* (2013.01); *F05D 2220/32* (2013.01); *F05D 2240/127* (2013.01); *F05D 2240/14* (2013.01); *F05D 2260/14* (2013.01)

(58) Field of Classification Search
CPC .... F02C 7/045; F02C 7/04; F02K 3/06; F05D 2220/32; F05D 2240/127; F05D 2240/14; F05D 2260/14; F05D 2220/36; F05D 2250/51; F05D 2260/961; Y02T 50/60
See application file for complete search history.

(56) References Cited

U.S. PATENT DOCUMENTS

| | | | |
|---|---|---|---|
| 3,664,612 | A | 5/1972 | Skidmore et al. |
| 4,254,619 | A | 3/1981 | Griffin, III et al. |
| 5,010,729 | A | 4/1991 | Adamson et al. |
| 5,230,605 | A * | 7/1993 | Yamaguchi ............ F04D 29/563 415/151 |
| 5,458,457 | A | 10/1995 | Goto et al. |
| 6,409,469 | B1 | 6/2002 | Tse |
| 6,431,820 | B1 | 8/2002 | Beacock et al. |
| 6,457,938 | B1 | 10/2002 | Liu et al. |
| 6,508,630 | B2 | 1/2003 | Liu et al. |
| 6,540,477 | B2 | 4/2003 | Glynn et al. |
| 6,546,734 | B2 | 4/2003 | Antoine et al. |
| 6,585,482 | B1 | 7/2003 | Liotta et al. |
| 6,834,505 | B2 | 12/2004 | Al-Roub et al. |
| 6,935,833 | B2 | 8/2005 | Seitz |
| 6,973,193 | B1 * | 12/2005 | Tse ....................... G10K 11/175 181/204 |
| 7,025,565 | B2 | 4/2006 | Urso et al. |
| 7,055,304 | B2 | 6/2006 | Courtot et al. |
| 7,210,900 | B2 | 5/2007 | Urso et al. |
| 7,246,773 | B2 | 7/2007 | Stoner et al. |
| 7,313,963 | B2 | 1/2008 | Kuznar |
| 7,374,403 | B2 | 5/2008 | Decker et al. |
| 7,374,404 | B2 | 5/2008 | Schilling |
| 7,407,364 | B2 | 8/2008 | Arnold et al. |
| 7,413,401 | B2 | 8/2008 | Szucs et al. |
| 7,575,412 | B2 | 8/2009 | Seitz |
| 7,789,620 | B2 | 9/2010 | Vontell, Sr. et al. |
| 7,854,778 | B2 | 12/2010 | Groom et al. |
| 7,871,244 | B2 | 1/2011 | Marini et al. |
| 7,874,137 | B2 | 1/2011 | Chaney et al. |
| 7,882,694 | B2 | 2/2011 | Suciu et al. |
| 7,955,046 | B2 | 6/2011 | McCune et al. |
| 8,021,104 | B2 | 9/2011 | Gu et al. |
| 8,226,360 | B2 | 7/2012 | Scoggins et al. |
| 8,328,518 | B2 | 12/2012 | Liang et al. |
| 8,529,188 | B2 | 9/2013 | Winter |
| 8,579,584 | B2 | 11/2013 | Brown |
| 8,689,538 | B2 | 4/2014 | Sankrithi et al. |
| 8,690,519 | B2 | 4/2014 | Aalburg et al. |
| 8,757,959 | B2 | 6/2014 | Suciu et al. |
| 8,806,871 | B2 | 8/2014 | McMasters et al. |
| 8,943,796 | B2 | 2/2015 | McCaffrey |
| 9,003,808 | B2 | 4/2015 | Kupratis |
| 9,039,364 | B2 | 5/2015 | Alvanos et al. |
| 9,045,991 | B2 | 6/2015 | Read et al. |
| 9,068,470 | B2 | 6/2015 | Mills et al. |
| 9,074,483 | B2 | 7/2015 | Breeze-Stringfellow et al. |
| 9,140,212 | B2 | 9/2015 | Moon et al. |
| 9,206,697 | B2 | 12/2015 | Tibbott et al. |
| 9,206,740 | B2 | 12/2015 | Wong et al. |
| 9,228,497 | B2 | 1/2016 | Ottow et al. |
| 9,506,361 | B2 | 11/2016 | Fielding et al. |
| 9,523,284 | B2 | 12/2016 | Miller et al. |
| 9,540,094 | B2 | 1/2017 | Negulescu et al. |
| 9,695,751 | B2 | 7/2017 | Kupratis et al. |
| 9,784,134 | B2 | 10/2017 | Eleftheriou |
| 9,797,261 | B2 | 10/2017 | Tibbott et al. |
| 9,835,092 | B2 | 12/2017 | Sawyers-Abbott et al. |
| 9,840,930 | B2 | 12/2017 | Lee et al. |
| 9,863,256 | B2 | 1/2018 | Lee et al. |
| 9,874,102 | B2 | 1/2018 | Azad et al. |
| 9,874,109 | B2 | 1/2018 | Hatcher, Jr. et al. |
| 9,945,247 | B2 | 4/2018 | Appukuttan et al. |
| 9,957,918 | B2 | 5/2018 | Suciu et al. |
| 10,018,167 | B2 | 7/2018 | Tentorio |
| 10,060,270 | B2 | 8/2018 | Lee et al. |
| 10,060,351 | B2 | 8/2018 | Oggero |
| 10,066,508 | B2 | 9/2018 | Geiger |
| 10,113,444 | B2 | 10/2018 | Huang et al. |
| 10,131,443 | B2 | 11/2018 | Namgoong |
| 10,145,301 | B2 | 12/2018 | Abrari et al. |
| 10,184,340 | B2 | 1/2019 | Baltas et al. |
| 10,196,895 | B2 | 2/2019 | Weinert et al. |
| 10,196,901 | B2 | 2/2019 | Wong et al. |
| 10,215,192 | B2 | 2/2019 | Griffin |
| 10,240,526 | B2 | 3/2019 | Suciu et al. |
| 10,252,790 | B2 | 4/2019 | Ramakrishnan |
| 10,260,527 | B2 | 4/2019 | Steen |
| 10,273,880 | B2 | 4/2019 | Kolvick et al. |
| 10,288,010 | B2 | 5/2019 | Houston et al. |
| 10,288,083 | B2 | 5/2019 | Miller et al. |
| 10,344,711 | B2 * | 7/2019 | Hsu ....................... F04D 29/545 |
| 10,371,054 | B2 | 8/2019 | Sasse et al. |
| 10,378,554 | B2 | 8/2019 | Yu et al. |
| 10,385,871 | B2 | 8/2019 | Lurie et al. |
| 10,393,132 | B2 | 8/2019 | Lee et al. |
| 10,399,664 | B2 | 9/2019 | Bowden et al. |
| 10,415,409 | B2 | 9/2019 | Oyarbide |
| 10,436,046 | B2 | 10/2019 | Fentem et al. |
| 10,480,328 | B2 | 11/2019 | Weaver et al. |
| 10,480,413 | B2 | 11/2019 | Snyder |
| 10,502,232 | B2 | 12/2019 | Mohtar et al. |
| 10,519,859 | B2 | 12/2019 | Marchaj et al. |
| 10,557,415 | B2 | 2/2020 | Boudebiza et al. |
| 10,563,513 | B2 | 2/2020 | Kalitzin et al. |
| 10,634,059 | B2 | 4/2020 | Rami et al. |
| 10,641,178 | B2 | 5/2020 | Corrandini et al. |
| 10,690,146 | B2 | 6/2020 | Urac et al. |
| 10,695,704 | B2 | 6/2020 | Mook et al. |
| 10,711,797 | B2 * | 7/2020 | Kroger .................. F04D 29/684 |
| 10,724,395 | B2 | 7/2020 | Kupratis et al. |
| 10,724,435 | B2 * | 7/2020 | Kroger .................. F04D 29/563 |
| 10,738,694 | B1 | 8/2020 | Kupratis et al. |
| 10,787,909 | B2 | 9/2020 | Hiernaux |
| 10,794,224 | B2 | 10/2020 | Schiessl |
| 10,794,292 | B2 | 10/2020 | Kupratis et al. |
| 10,794,395 | B2 | 10/2020 | Tamada |
| 10,794,396 | B2 * | 10/2020 | Kroger ....................... F02C 7/04 |
| 10,801,442 | B2 | 10/2020 | Clements et al. |
| 10,815,886 | B2 * | 10/2020 | Kroger .................. F04D 29/541 |
| 10,816,208 | B2 | 10/2020 | DiCintio et al. |
| 10,822,999 | B2 | 11/2020 | Morris et al. |
| 10,823,114 | B2 | 11/2020 | Clements et al. |
| 10,830,135 | B2 | 11/2020 | Slawinska et al. |
| 10,837,361 | B2 | 11/2020 | Abrari et al. |
| 10,883,515 | B2 | 1/2021 | Lurie et al. |
| 10,961,864 | B2 | 3/2021 | Miranda et al. |
| 2001/0023582 | A1 | 9/2001 | Nagel |
| 2008/0041064 | A1 | 2/2008 | Moore et al. |
| 2008/0155959 | A1 | 7/2008 | Rasheed et al. |
| 2008/0232963 | A1 | 9/2008 | Durocher et al. |
| 2009/0155053 | A1 | 6/2009 | Speak |
| 2009/0255116 | A1 | 10/2009 | McMasters et al. |
| 2009/0277181 | A1 | 11/2009 | Druon et al. |
| 2011/0044796 | A1 | 2/2011 | Hussain et al. |
| 2012/0240594 | A1 | 9/2012 | Shamara |
| 2013/0192263 | A1 | 8/2013 | Suciu et al. |
| 2013/0323011 | A1 | 12/2013 | Chopra et al. |
| 2014/0208755 | A1 | 7/2014 | Ekanayake et al. |
| 2014/0208768 | A1 | 7/2014 | Bacic |
| 2014/0318137 | A1 | 10/2014 | McMasters et al. |
| 2015/0198050 | A1 | 7/2015 | Lee et al. |
| 2015/0198163 | A1 | 7/2015 | Lei et al. |

(56) References Cited

U.S. PATENT DOCUMENTS

| | | |
|---|---|---|
| 2016/0003046 A1 | 1/2016 | Smith et al. |
| 2016/0017751 A1 | 1/2016 | Caruel |
| 2016/0047307 A1 | 2/2016 | Williamson et al. |
| 2016/0047308 A1 | 2/2016 | Williamson et al. |
| 2016/0047309 A1 | 2/2016 | Davidson et al. |
| 2016/0047335 A1 | 2/2016 | Davidson et al. |
| 2016/0084265 A1* | 3/2016 | Yu .................... F04D 29/542 415/177 |
| 2016/0195010 A1 | 7/2016 | Roberge |
| 2017/0030213 A1 | 2/2017 | Vlasic et al. |
| 2017/0138202 A1 | 5/2017 | Wadia et al. |
| 2017/0146026 A1 | 5/2017 | Griffin |
| 2017/0191372 A1 | 7/2017 | Tralshawala et al. |
| 2017/0198723 A1* | 7/2017 | Hsu .................... F04D 29/522 |
| 2017/0292532 A1 | 10/2017 | Wall |
| 2017/0298751 A1 | 10/2017 | Messmann et al. |
| 2017/0314509 A1 | 11/2017 | Laricchiuta et al. |
| 2018/0010617 A1 | 1/2018 | Casavant et al. |
| 2018/0023591 A1 | 1/2018 | Adjan |
| 2018/0045059 A1 | 2/2018 | Lee et al. |
| 2018/0112546 A1 | 4/2018 | Griffin |
| 2018/0135432 A1 | 5/2018 | Martin, Jr. et al. |
| 2018/0216527 A1 | 8/2018 | D'Angelo et al. |
| 2018/0223733 A1 | 8/2018 | Zhang et al. |
| 2018/0230944 A1 | 8/2018 | Suciu et al. |
| 2018/0283183 A1 | 10/2018 | Gallier et al. |
| 2018/0334916 A1 | 11/2018 | Lurie et al. |
| 2018/0363676 A1 | 12/2018 | Kroger et al. |
| 2019/0010868 A1 | 1/2019 | Davidson et al. |
| 2019/0048798 A1 | 2/2019 | Slawinska et al. |
| 2019/0063243 A1 | 2/2019 | Lemaire |
| 2019/0107119 A1 | 4/2019 | Yu et al. |
| 2019/0226402 A1 | 7/2019 | Kray et al. |
| 2019/0284693 A1 | 9/2019 | Task |
| 2019/0284940 A1 | 9/2019 | Task et al. |
| 2019/0338707 A1 | 11/2019 | Beecroft et al. |
| 2019/0368421 A1 | 12/2019 | Sweidan |
| 2020/0025110 A1 | 1/2020 | Silkowski |
| 2020/0049077 A1 | 2/2020 | Schwarz et al. |
| 2020/0080432 A1 | 3/2020 | Filipenco |
| 2020/0123918 A1 | 4/2020 | Duong et al. |
| 2020/0141277 A1 | 5/2020 | Cooper et al. |
| 2020/0149421 A1 | 5/2020 | Lad |
| 2020/0276641 A1 | 9/2020 | Benard et al. |
| 2020/0284261 A1 | 9/2020 | Merchant et al. |
| 2020/0300174 A1 | 9/2020 | Williamson et al. |
| 2020/0316508 A1 | 10/2020 | Mook et al. |
| 2020/0347737 A1 | 11/2020 | Bordoni |
| 2021/0078715 A1 | 3/2021 | Bevirt et al. |
| 2021/0087948 A1 | 3/2021 | Suciu |
| 2021/0108597 A1 | 4/2021 | Ostdiek et al. |

* cited by examiner

TURBOFAN ENGINE HAVING ANGLED INLET PRE-SWIRL VANES

CROSS-REFERENCE TO RELATED APPLICATIONS

This application is a Divisional Application of U.S. application Ser. No. 17/676,454 filed Feb. 21, 2022, which is hereby incorporated by reference in its entirety.

TECHNICAL FIELD

The present subject matter relates generally to a gas turbine engine, or more particularly to a gas turbine engine configured to guide an airflow at an inlet of a nacelle and to direct incoming objects towards an outer portion of the engine and away from a core of the engine.

BACKGROUND

A turbofan engine generally includes a fan having a plurality of fan blades and a turbomachine arranged in flow communication with one another. Additionally, the turbomachine of the turbofan engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
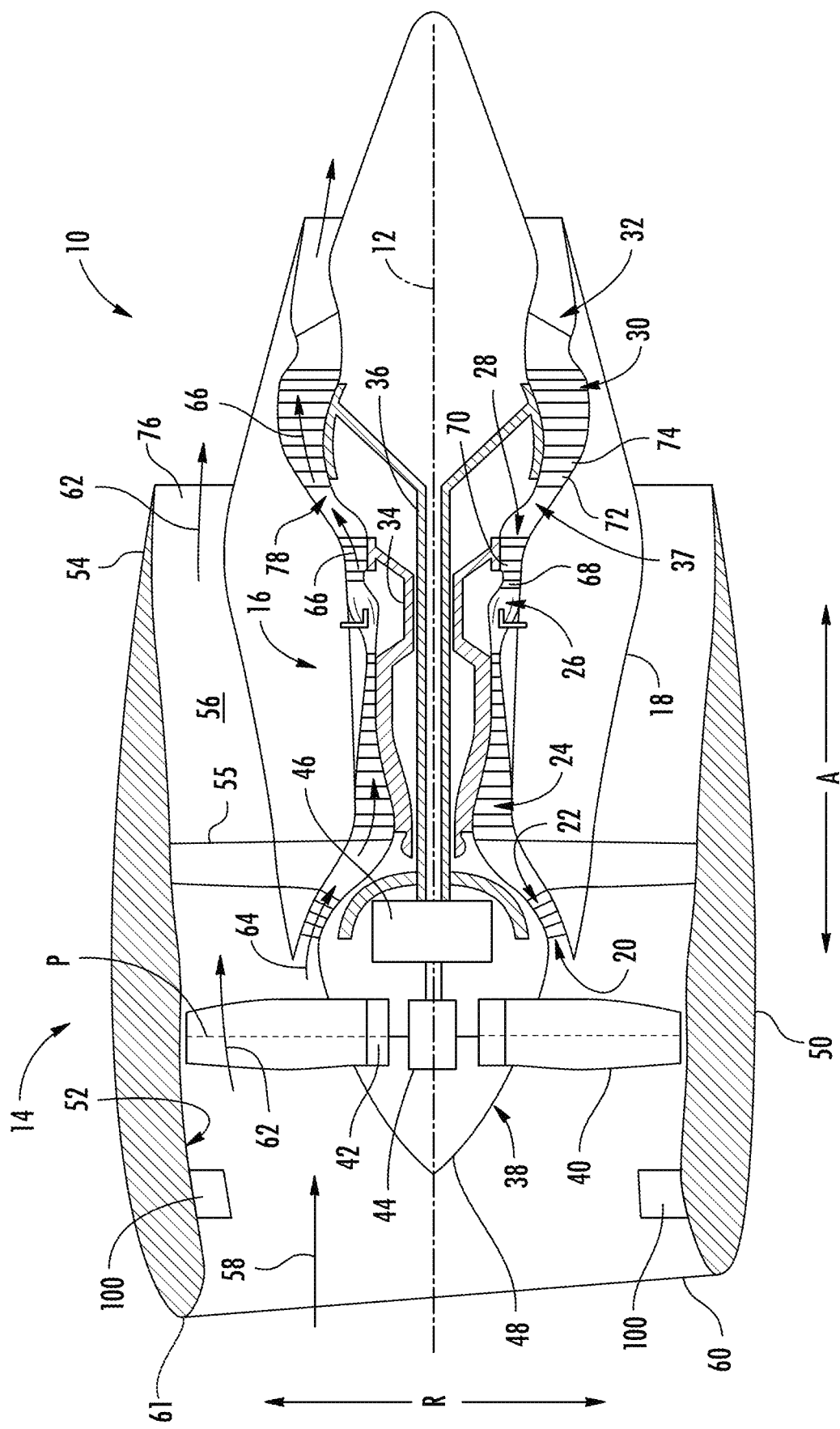
FIG. 1 is a schematic cross-sectional view of an exemplary gas turbine engine according to an exemplary embodiment of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "fan pressure ratio" refers to a ratio of an air pressure immediately downstream of the fan blades if a fan during operation of the fan to an air pressure immediately upstream of the fan blades of the fan during operation of the fan.

As used herein, the term "rated speed" with reference to a turbofan engine refers to a maximum rotational speed that the turbofan engine may achieve while operating properly. For example, the turbofan engine may be operating at the rated speed during maximum load operations, such as during takeoff operations.

Also as used herein, the term "fan tip speed" as defined by the plurality of fan blades of the fan refers to a linear speed of an outer tip of a fan blade along a radial direction during operation of the fan.

The present disclosure is generally related to an inlet pre-swirl vane configured as a plurality of part span inlet guide vanes for a turbofan engine. In the present disclosure, the plurality of part span inlet guide vanes are angled at a first angle with respect to a radius of an outer nacelle of the turbofan engine. Furthermore, the plurality of part span inlet guide vanes define a chord and the chord of the part span inlet guide vane is angled at a second angle with respect to the longitudinal axis of the outer nacelle.

In this manner, the plurality of part span inlet guide vanes are configured to direct incoming objects towards an outer portion of the turbofan engine. The plurality of part span inlet guide vanes are configured to direct incoming objects away from a core air flowpath of the turbofan engine and towards a bypass airflow passage. This provides a deflection mechanism that facilitates ingestion of an object into an outer portion of the turbofan engine by minimizing the chance that the object travels to the core of the turbofan engine. Such objects may include bird strikes, hail, ice, sandstorms, debris, and other foreign objects.

Furthermore, in this manner, the plurality of part span inlet guide vanes are also configured to pre-swirl an airflow provided through an inlet of the outer nacelle, upstream of the plurality of fan blades of a fan. As discussed herein, pre-swirling the airflow provided through the inlet of the outer nacelle prior to such airflow reaching the plurality of fan blades of the fan may reduce separation losses and/or shock losses, allowing the fan to operate with relatively high fan tip speeds with less losses in efficiency. Furthermore, in this manner, the plurality of part span inlet guide vanes are also configured to minimize flutter and maintain laminar air flow over the part span inlet guide vanes and minimize turbulence in the inlet.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10", configured to be mounted to an aircraft, such as in an under-wing configuration or tail-mounted configuration. As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

In exemplary embodiments, the fan section 14 includes twenty-two (22) or fewer fan blades 40. In certain exemplary embodiments, the fan section 14 includes twenty (20) or fewer fan blades 40. In certain exemplary embodiments, the fan section 14 includes eighteen (18) or fewer fan blades 40. In certain exemplary embodiments, the fan section 14 includes sixteen (16) or fewer fan blades 40. In certain exemplary embodiments, it is contemplated that the fan section 14 includes other number of fan blades 40 for a particular application.

During operation of the turbofan engine 10, the fan 38 defines a fan pressure ratio and the plurality of fan blades 40 each define a fan tip speed. The exemplary turbofan engine 10 depicted defines a relatively high fan tip speed and relatively low fan pressure ratio during operation of the turbofan engine at a rated speed. As used herein, the term "fan pressure ratio" refers to a ratio of an air pressure immediately downstream of the fan blades 40 during operation of the fan 38 to an air pressure immediately upstream of the fan blades 40 during operation of the fan 38. For the embodiment depicted in FIG. 1, the fan 38 of the turbofan engine 10 defines a relatively low fan pressure ratio. For example, the turbofan engine 10 depicted defines a fan pressure ratio less than or equal to about 1.5. For example, in certain exemplary embodiments, the turbofan engine 10 may define a fan pressure ratio less than or equal to about 1.4. In certain exemplary embodiments, it is contemplated that the turbofan engine 10 may define other fan pressure ratios for a particular application. The fan pressure ratio may be the fan pressure ratio of the fan 38 during operation of the turbofan engine 10, such as during operation of the turbofan engine 10 at a rated speed.

As used herein, the term "rated speed" with reference to the turbofan engine 10 refers to a maximum rotational speed that the turbofan engine 10 may achieve while operating properly. For example, the turbofan engine 10 may be operating at the rated speed during maximum load operations, such as during takeoff operations.

Also as used herein, the term "fan tip speed" defined by the plurality of fan blades 40 refers to a linear speed of an outer tip of a fan blade 40 along the circumferential direction during operation of the fan 38. In exemplary embodiments, the turbofan engine 10 of the present disclosure causes the fan blades 40 of the fan 38 to rotate at a relatively high rotational speed. For example, during operation of the turbofan engine 10 at the rated speed, the fan tip speed of each of the plurality of fan blades 40 is greater than or equal to 1,000 feet per second and less than or equal to 2,250 feet per second. In certain exemplary embodiments, during operation of the turbofan engine 10 at the rated speed, the fan tip speed of each of the fan blades 40 may be greater than or equal to 1,250 feet per second and less than or equal to 2,250 feet per second. In certain exemplary embodiments, during operation of the turbofan engine 10 at the rated speed, the fan tip speed of each of the fan blades 40 may be greater than or equal to about 1,350 feet per second, such as greater than about 1,450 feet per second, such as greater than about 1,550 feet per second, and less than or equal to 2,250 feet per second. In certain exemplary embodiments, it is contemplated that during operation of the turbofan engine 10 at the rated speed, the fan tip speed of each of the fan blades 40 may define other ranges for a particular application.

Referring still to the exemplary embodiment of FIG. 1, the disk 42 is covered by rotatable front nacelle or hub 48 aerodynamically contoured to promote an airflow through the plurality of fan blades 40. Additionally, the exemplary fan section 14 includes an annular fan casing or outer nacelle 50 that at least partially, and for the embodiment depicted, circumferentially, surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37. The ratio between an amount of airflow through the bypass airflow passage 56 (i.e., the first portion of air indicated by arrows 62) to an amount of airflow through the core air flowpath 37 (i.e., the second portion of air indicated by arrows 64) is known as a bypass ratio.

Referring still to FIG. 1, the compressed second portion of air indicated by arrows 64 from the compressor section mixes with fuel and is burned within the combustion section to provide combustion gases 66. The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air indicated by arrows 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Referring still to FIG. 1, the turbofan engine 10 of the present disclosure also provides pre-swirling flow forward of a tip of the fan blade 40 as described herein. For example, the turbofan engine 10 additionally includes an inlet pre-swirl vane, e.g., configured as a plurality of part span inlet guide vanes 100, as described in greater detail herein.

In some exemplary embodiments, it will be appreciated that the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least about 20,000 pounds of thrust, such as at least about 25,000 pounds of thrust, such as at least about 30,000 pounds of thrust, and up to, e.g., about 150,000 pounds of thrust. Accordingly, the turbofan engine 10 may be referred to as a relatively large power class gas turbine engine.

Moreover, it should be appreciated that the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., power gearbox 46) driving the fan, may include any other suitable number or arrangement of shafts, spools, compressors, turbines, etc.

Figure 2:
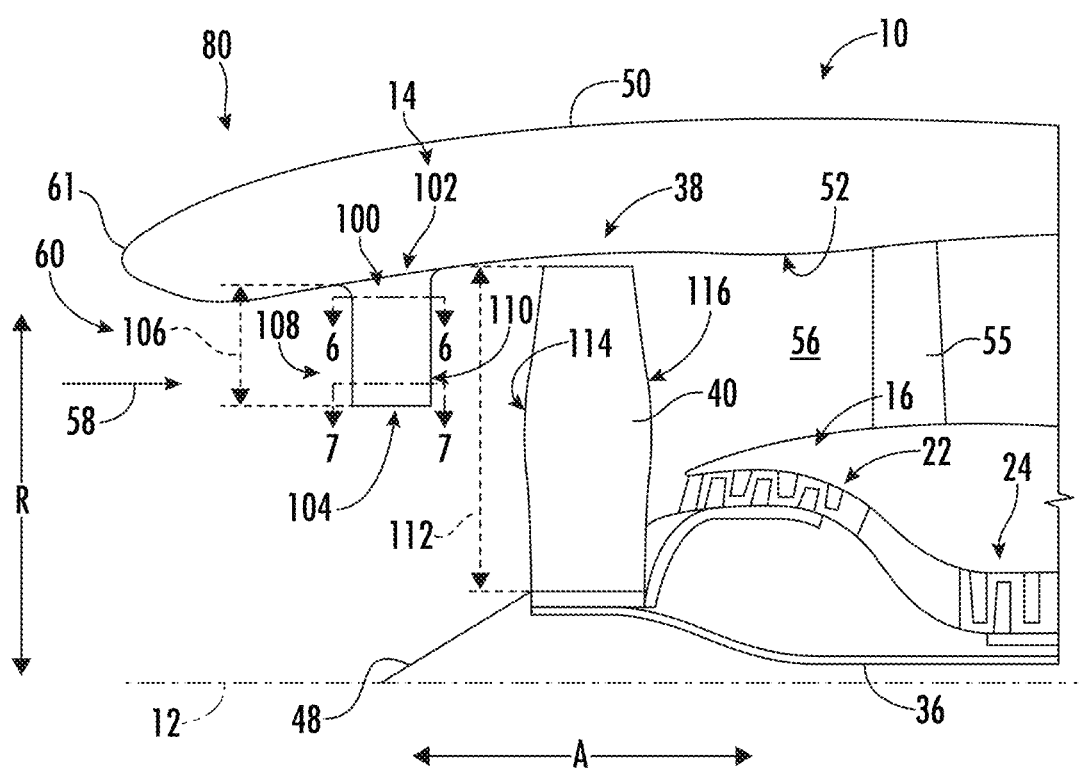
FIG. 2 is a close-up, schematic, cross-sectional view of a forward end of the exemplary gas turbine engine of FIG. 1 according to an exemplary embodiment of the present subject matter.

As discussed above, the turbofan engine 10 of the present disclosure also provides pre-swirling flow forward a tip of the fan blade 40. Referring now also to FIG. 2, a close-up, cross-sectional view of the fan section 14 and forward end of the turbomachine 16 of the exemplary turbofan engine 10 of FIG. 1 is provided. In exemplary embodiments, the turbofan engine 10 includes an inlet pre-swirl vane located upstream of the plurality of fan blades 40 of the fan 38 and coupled to the outer nacelle 50. For example, the inlet pre-swirl vane can be directly attached to, indirectly attached to, or integrated into the outer nacelle 50. More specifically, for the embodiment of FIGS. 1 and 2, the inlet pre-swirl vane is configured as a plurality of part span inlet guide vanes 100. The plurality of part span inlet guide vanes 100 are each cantilevered from the outer nacelle 50 (such as from the inner wall 52 of the outer nacelle 50) at a location forward of the plurality of fan blades 40 of the fan 38 along the axial direction A and aft of the inlet 60 of the outer nacelle 50. More specifically, each of the plurality of part span inlet guide vanes 100 define an outer end 102 along the radial direction R, and are coupled to the outer nacelle 50 at the radially outer end 102 through a suitable connection means (not shown). For example, each of the plurality of part span inlet guide vanes 100 may be bolted to the inner wall 52 of the outer nacelle 50 at the outer end 102, welded to the inner wall 52 of the outer nacelle 50 at the outer end 102, or coupled to the outer nacelle 50 in any other suitable manner at the outer end 102.

Referring still to FIG. 2, in an exemplary embodiment, a nacelle assembly 80 of the present disclosure includes the outer nacelle 50 and the inlet pre-swirl vane, e.g., a plurality of part span inlet guide vanes 100. Further, for the embodiment depicted, the plurality of part span inlet guide vanes 100 extend generally along the radial direction R from the outer end 102 to an inner end 104 (i.e., an inner end 104 along the radial direction R). Moreover, as will be appreciated, for the embodiment depicted, each of the plurality of part span inlet guide vanes 100 are unconnected with an adjacent part span inlet guide vane 100 at the respective inner ends 104 (i.e., adjacent part span inlet guide vanes 100 do not contact one another at the radially inner ends 104, and do not include any intermediate connection members at the radially inner ends 104, such as a connection ring, strut, etc.). More specifically, for the embodiment depicted, each part span inlet guide vane 100 is completely supported by a connection to the outer nacelle 50 at the respective outer end 102 (and not through any structure extending, e.g., between adjacent part span inlet guide vanes 100 at a location inward of the outer end 102 along the radial direction R). As will be discussed below, such may reduce an amount of turbulence generated by the part span inlet guide vanes 100.

Moreover, as depicted, each of the plurality of part span inlet guide vanes 100 do not extend completely between the outer nacelle 50 and, e.g., the hub 48 of the turbofan engine 10. More specifically, for the embodiment depicted, each of the plurality of inlet guide vanes define an inlet guide vane ("IGV") span 106 along the radial direction R, which refers to a measure along the radial direction R between the outer end 102 and the inner end 104 of the part span inlet guide vane 100 at the leading edge 108 of the part span inlet guide vane 100. Each of the plurality of part span inlet guide vanes 100 further define a leading edge 108 and a trailing edge 110. Similarly, it will be appreciated, that the plurality of fan blades 40 of the fan 38 define a fan blade span 112 along the radial direction R, which refers to a measure along the radial direction R between a radially outer tip and a base of the fan blade 40 at the leading edge 114 of the respective fan blade 40. Each of the plurality of fan blades 40 of the fan 38 also defines a leading edge 114 and a trailing edge 116.

For the embodiment depicted, the IGV span 106 is at least about five percent of the fan blade span 112 and up to about fifty-five percent of the fan blade span 112. For example, in certain exemplary embodiments, the IGV span 106 may be between about fifteen percent of the fan blade span 112 and about forty-five percent of the fan blade span 112, such as between about thirty percent of the fan blade span 112 and about forty percent of the fan blade span 112.

Figure 3:
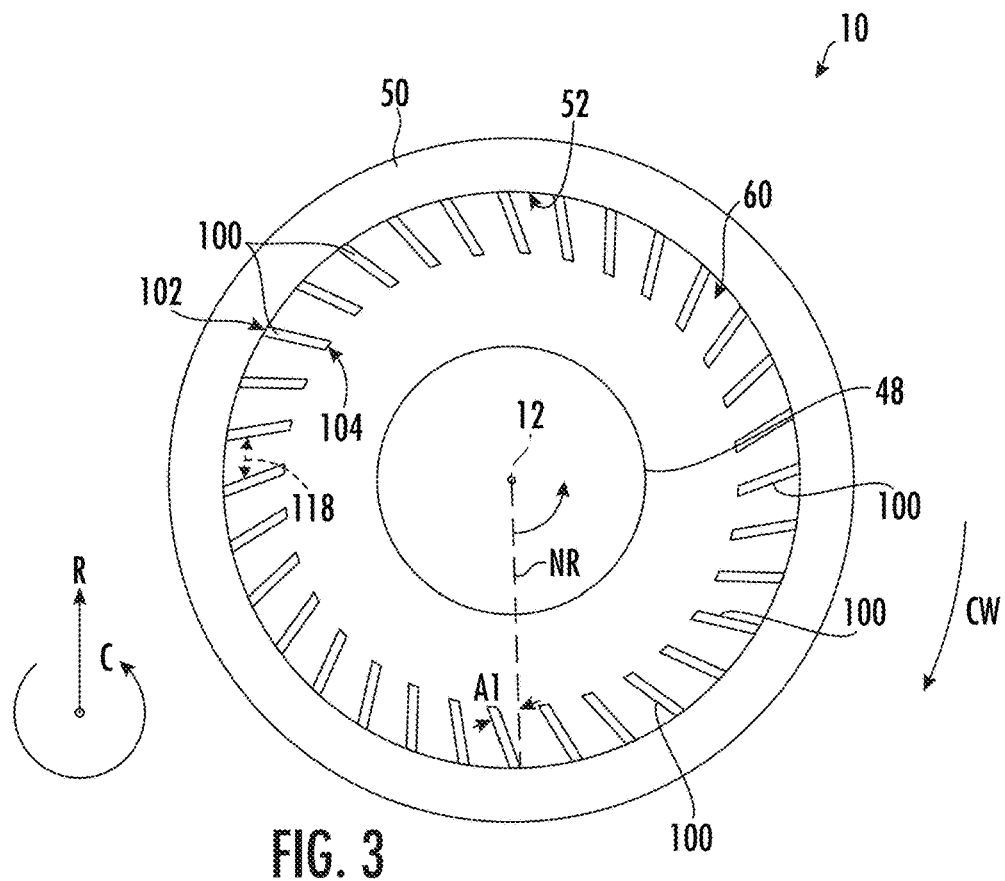
FIG. 3 is a schematic view of an inlet to the exemplary gas turbine engine of FIG. 1, along an axial direction of the gas turbine engine of FIG. 1 according to an exemplary embodiment of the present subject matter.

Reference will now also be made to FIG. 3, providing an axial view of the inlet 60 to the turbofan engine 10 of FIGS. 1 and 2. As will be appreciated, the plurality of part span inlet guide vanes 100 of the turbofan engine 10 includes a relatively large number of part span inlet guide vanes 100. For example, for the embodiment depicted, the plurality of part span inlet guide vanes 100 of the turbofan engine 10 includes thirty-two part span inlet guide vanes 100. In other exemplary embodiments, it is contemplated that the plurality of part span inlet guide vanes 100 includes between about ten part span inlet guide vanes 100 and about fifty part span inlet guide vanes 100. In further exemplary embodiments, it is contemplated that the plurality of part span inlet guide vanes 100 includes between about twenty part span inlet guide vanes 100 and about forty-five part span inlet guide vanes 100. Additionally, for the embodiment depicted, each of the plurality of part span inlet guide vanes 100 are spaced substantially evenly (e.g., equidistant) along the circumferential direction C. More specifically, each of the plurality of part span inlet guide vanes 100 defines a circumferential spacing 118 with an adjacent part span inlet guide vane 100, with the circumferential spacing 118 being substantially equal between each adjacent part span inlet guide vane 100.

Although not depicted, in certain exemplary embodiments, the number of part span inlet guide vanes 100 may be substantially equal to the number of fan blades 40 (FIG. 1)

of the fan 38 (FIG. 1) of the turbofan engine 10. In other embodiments, however, the number of part span inlet guide vanes 100 may be greater than the number of fan blades 40 of the fan 38 of the turbofan engine 10, or alternatively, may be less than the number of fan blades 40 of the fan 38 of the turbofan engine 10.

Figure 4:
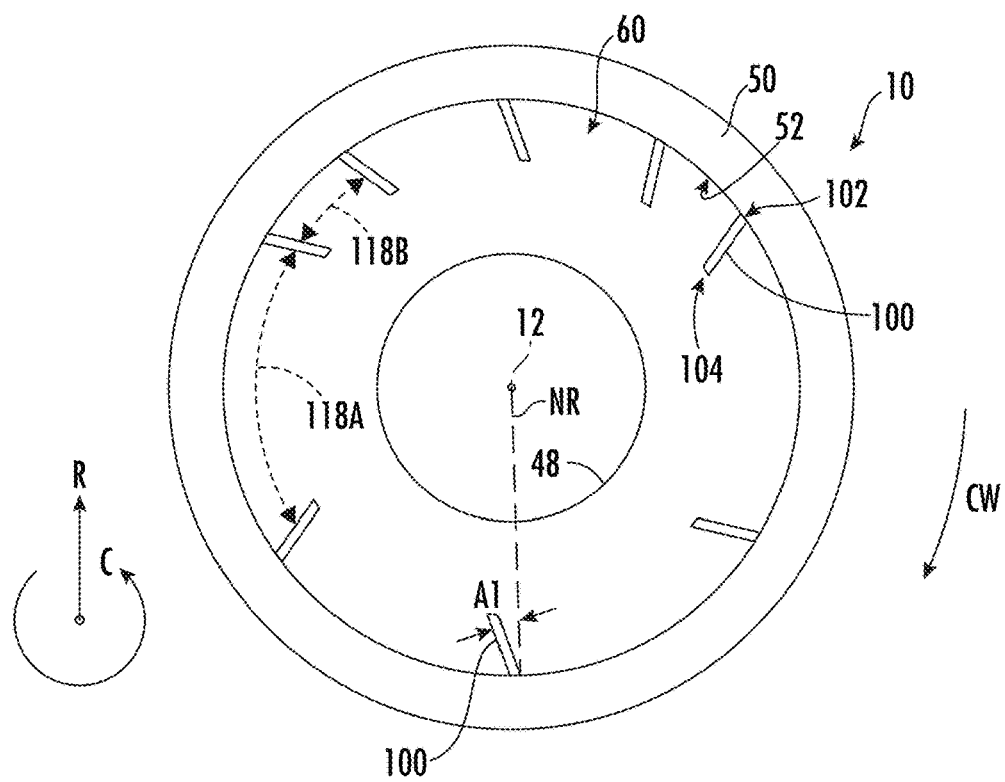
FIG. 4 it is a schematic view of an inlet to a gas turbine engine in accordance with another exemplary embodiment of the present disclosure.

Further, it should be appreciated, that in other exemplary embodiments, the turbofan engine 10 may include any other suitable number of part span inlet guide vanes 100 and/or circumferential spacing 118 of the part span inlet guide vanes 100. For example, referring now briefly to FIG. 4, an axial view of an inlet 60 to a turbofan engine 10 in accordance with another exemplary embodiment of the present disclosure is provided. For the embodiment of FIG. 4, the turbofan engine 10 includes less than twenty part span inlet guide vanes 100. More specifically, for the embodiment of FIG. 4, the turbofan engine 10 includes at least eight part span inlet guide vanes 100, or more specifically includes exactly eight part span inlet guide vanes 100. Additionally, for the embodiment of FIG. 4, the plurality of part span inlet guide vanes 100 are not substantially evenly spaced along the circumferential direction C. For example, at least certain of the plurality of part span inlet guide vanes 100 define a first circumferential spacing 118A, while other of the plurality of part span inlet guide vanes 100 define a second circumferential spacing 118B. For the embodiment depicted, the first circumferential spacing 118A is at least about twenty percent greater than the second circumferential spacing 118B, such as at least about twenty-five percent greater such as at least about thirty percent greater, such as up to about two hundred percent greater. Notably, the circumferential spacing 118 refers to a mean circumferential spacing between adjacent part span inlet guide vanes 100. The non-uniform circumferential spacing may, e.g., offset structure upstream of the part span inlet guide vanes 100.

Referring back to FIG. 3, the outer nacelle 50 defines a radius NR. For the embodiment depicted, the plurality of part span inlet guide vanes 100 are angled (e.g., tilted) at a first angle A1 with respect to the radius NR of the outer nacelle 50.

In this manner, the plurality of part span inlet guide vanes 100 are configured to direct incoming objects towards an outer radial portion of the turbofan engine 10 (FIG. 1). The plurality of part span inlet guide vanes 100 are configured to direct incoming objects away from the core air flowpath 37 (FIG. 1) of the turbofan engine 10 and towards a bypass airflow passage 56 (FIG. 1). This provides a deflection mechanism that facilitates ingestion of an object into an outer radial portion of the turbofan engine 10 (FIG. 1) and thereby minimizing the chance that the object travels to the core of the turbofan engine 10.

Furthermore, in this manner, the plurality of part span inlet guide vanes 100 are also configured to pre-swirl an airflow 58 (FIG. 1) provided through the inlet 60 of the outer nacelle 50, upstream of the plurality of fan blades 40 (FIG. 1) of the fan 38 (FIG. 1). As discussed herein, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses in efficiency. Furthermore, in this manner, the plurality of part span inlet guide vanes 100 are also configured to minimize flutter and maintain laminar air flow over the part span inlet guide vanes 100 and minimize turbulence in the inlet 60.

In certain exemplary embodiments, the first angle A1 is between approximately 2 degrees and approximately 45 degrees. In other exemplary embodiments, it is contemplated that the first angle A1 is between other ranges for a particular application.

In the exemplary embodiment depicted in FIG. 3, the plurality of part span inlet guide vanes 100 are angled at the first angle A1 with respect to the radius NR of the outer nacelle 50 in a clockwise direction CW, i.e., the same direction that the fan blades 40 (FIG. 2) rotate in.

In an exemplary embodiment, the plurality of part span inlet guide vanes 100 are each angled at the same first angle A1 with respect to the radius NR of the outer nacelle 50. In other exemplary embodiments, the plurality of part span inlet guide vanes 100 are angled at different first angles A1 with respect to the radius NR of the outer nacelle 50 as will be described in more detail below.

Figure 5:
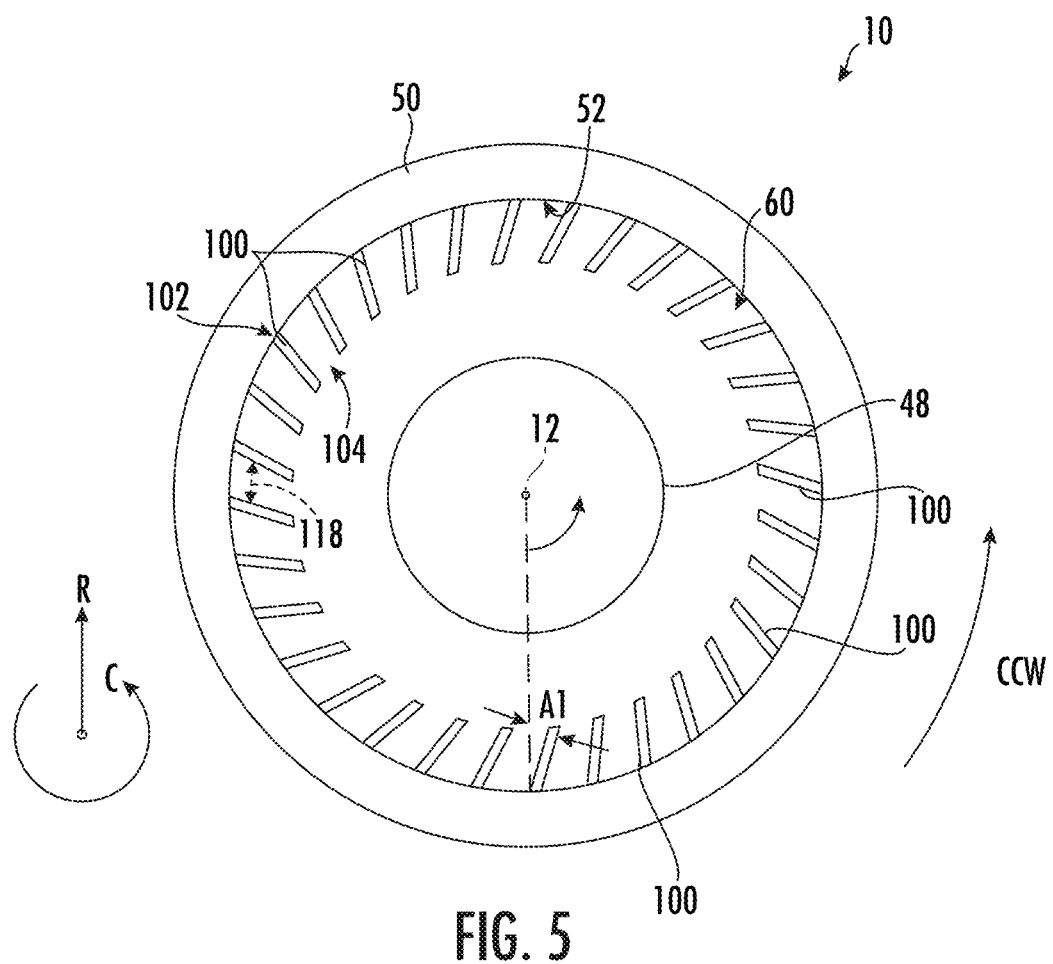
FIG. 5 is a schematic view of an inlet to the exemplary gas turbine engine of FIG. 1, along an axial direction of the gas turbine engine of FIG. 1 according to another exemplary embodiment of the present subject matter.

Referring now to FIG. 5, an axial view of the inlet 60 to the turbofan engine 10 of FIGS. 1 and 2, according to another exemplary embodiment, is provided. Referring to FIG. 5, in another exemplary embodiment, the plurality of part span inlet guide vanes 100 are angled at the first angle A1 with respect to the radius NR of the outer nacelle 50 in a counterclockwise direction CCW, i.e., the opposite direction that the fan blades 40 (FIG. 2) rotate in.

Referring now back to FIG. 2, as described above, each of the plurality of part span inlet guide vanes 100 are configured to pre-swirl an airflow 58 provided through the inlet 60 of the nacelle 50, upstream of the plurality of fan blades 40 of the fan 38. As discussed above, pre-swirling the airflow 58 provided through the inlet 60 of the nacelle 50 prior to such airflow 58 reaching the plurality of fan blades 40 of the fan 38 may reduce separation losses and/or shock losses, allowing the fan 38 to operate with the relatively high fan tip speeds described above with less losses of in efficiency.

Figure 6:
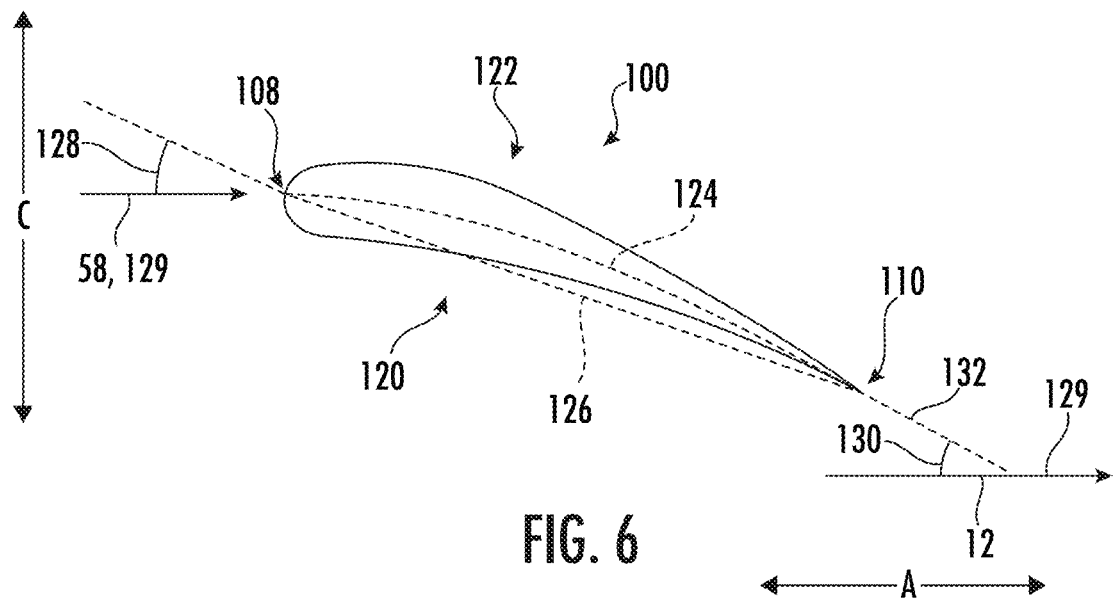
FIG. 6 is a cross-sectional view of a part span inlet guide vane of the exemplary gas turbine engine of FIG. 1 at a first location along a span of the part span inlet guide vane.

For example, referring first to FIG. 6, a cross-sectional view of one part span inlet guide vane 100 along the span of the part span inlet guide vanes 100, as indicated by Line 6-6 in FIG. 2, is provided. As is depicted, the part span inlet guide vane 100 is configured generally as an airfoil having a pressure side 120 and an opposite suction side 122, and extending between the leading edge 108 and the trailing edge 110 along a camber line 124. Additionally, the part span inlet guide vane 100 defines a chord line 126 extending directly from the leading edge 108 to the trailing edge 110. The chord line 126 of the part span inlet guide vane 100 is angled (e.g., twisted) at a second angle or angle of attack 128 with respect to the longitudinal axis 12 of the outer nacelle 50 (FIG. 2). For example, the chord line 126 defines a second angle or angle of attack 128 with an airflow direction 129 of the airflow 58 through the inlet 60 (FIG. 2) of the nacelle 50. Notably, for the embodiment depicted, the airflow direction 129 is substantially parallel to the axial direction A and the longitudinal axis 12 of the outer nacelle 50 of the turbofan engine 10. For the embodiment depicted, the angle of attack 128 at the location depicted along the span 106 of the part span inlet guide vanes 100 is at least approximately five degrees and up to approximately thirty-five degrees. For example, in certain embodiments, the angle of attack 128 at the location depicted along the span 106 of the part span inlet guide vane 100 may be between about ten degrees and about thirty degrees, such as between about fifteen degrees and about twenty-five degrees.

Additionally, the part span inlet guide vane 100, at the location depicted along the span 106 (FIG. 2) of the part span inlet guide vane 100 defines a local swirl angle 130 at the trailing edge 110. The "swirl angle" at the trailing edge 110 of the part span inlet guide vane 100, as used herein, refers to an angle between the airflow direction 129 of the airflow 58 through the inlet 60 (FIG. 2) of the nacelle 50 (FIG. 2) and a reference line 132 defined by a trailing edge section of the pressure side 120 of the part span inlet guide vane 100. More specifically, the reference line 132 is defined by the aft twenty percent of the pressure side 120, as measured along the chord line 126. Notably, when the aft twenty percent the pressure side 120 defines a curve, the reference line 132 may be a straight-line average fit of such curve (e.g., using least mean squares).

Further, it will be appreciated, that a maximum swirl angle 130 refers to the highest swirl angle 130 along the span 106 (FIG. 2) of the part span inlet guide vane 100. For the embodiment depicted, the maximum swirl angle 130 is defined proximate the radially outer end 102 (FIG. 2) of the part span inlet guide vane 100 (e.g., at the outer ten percent of the span 106 of the part span inlet guide vanes 100), as is represented by the cross-section depicted in FIG. 6. For the embodiment depicted, the maximum swirl angle 130 of each part span inlet guide vane 100 at the trailing edge 110 is between approximately five degrees and approximately thirty-five degrees. For example, in certain exemplary embodiments, the maximum swirl angle 130 of each part span inlet guide vane 100 at the trailing edge 110 may be between twelve degrees and twenty-five degrees.

Figure 7:
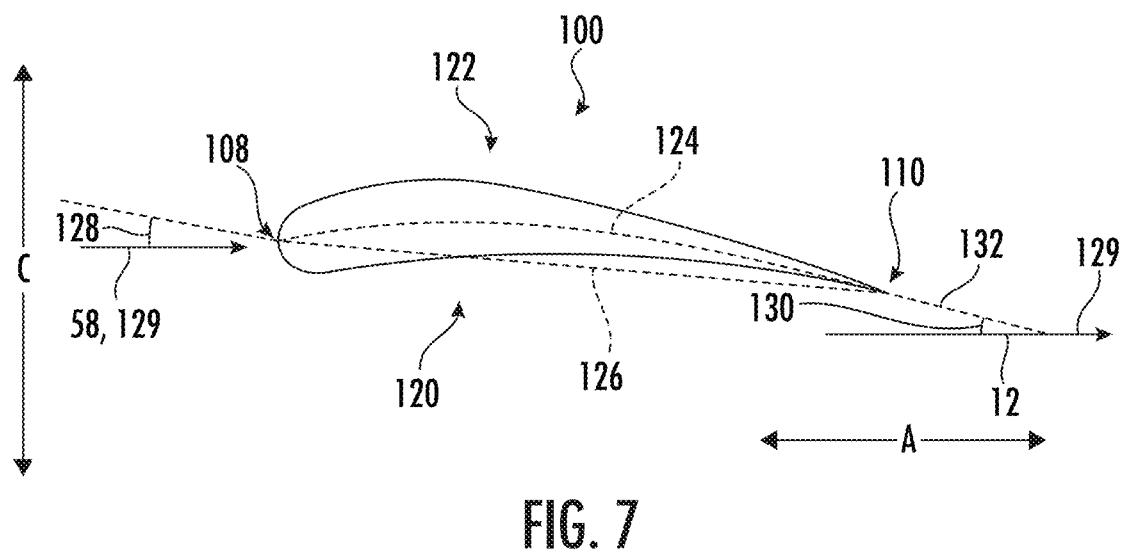
FIG. 7 is a cross-sectional view of the part span inlet guide vane of the exemplary gas turbine engine of FIG. 1 at a second location along the span of the part span inlet guide vane.

Moreover, it should be appreciated that for the embodiment of FIG. 2, the local swirl angle 130 increases from the radially inner end 104 (FIG. 2) to the radially outer end 102 (FIG. 2) of each part span inlet guide vane 100. For example, referring now also to FIG. 7, a cross-sectional view of a part span inlet guide vane 100 at a location radially inward from the cross-section viewed in FIG. 6, as indicated by Line 7-7 in FIG. 2, is provided. As is depicted in FIG. 7, and as stated above, the part span inlet guide vane 100 defines the pressure side 120, the suction side 122, the leading edge 108, the trailing edge 110, the camber line 124, and chord line 126. Further, the second angle or angle of attack 128 defined by the chord line 126 and the airflow direction 129 of the airflow 58 through the inlet 60 of the nacelle 50 at the location along the span 106 depicted in FIG. 7 is less than the angle of attack 128 at the location along the span 106 depicted in FIG. 6 (e.g., may be at least about twenty percent less, such as at least about fifty percent less, such as up to about one hundred percent less). Additionally, the part span inlet guide vane 100 defines a local swirl angle 130 at the trailing edge 110 at the location along the span 106 of the part span inlet guide vane 100 proximate the inner end 104, as depicted in FIG. 7. As stated above, the local swirl angle 130 increases from the radially inner end 104 to the radially outer end 102 of each part span inlet guide vanes 100. Accordingly, the local swirl angle 130 proximate the outer end 102 (see FIG. 6) is greater than the local swirl angle 130 proximate the radially inner end 104 (see FIG. 7; e.g., the radially inner ten percent of the span 106). For example, the local swirl angle 130 may approach zero degrees (e.g., may be less than about five degrees, such as less than about two degrees) at the radially inner end 104.

Notably, including part span inlet guide vanes 100 of such a configuration may reduce an amount of turbulence at the radially inner end 104 (FIG. 2) of each respective part span inlet guide vane 100. Additionally, such a configuration may provide a desired amount of pre-swirl at the radially outer ends of the plurality of fan blades 40 (FIG. 2) of the fan 38 (FIG. 2) (where the speed of the fan blades 40 is the greatest) to provide a desired reduction in flow separation and/or shock losses that may otherwise occur due to a relatively high speed of the plurality of fan blades 40 at the fan tips during operation of the turbofan engine 10 (FIG. 2).

Figure 8:
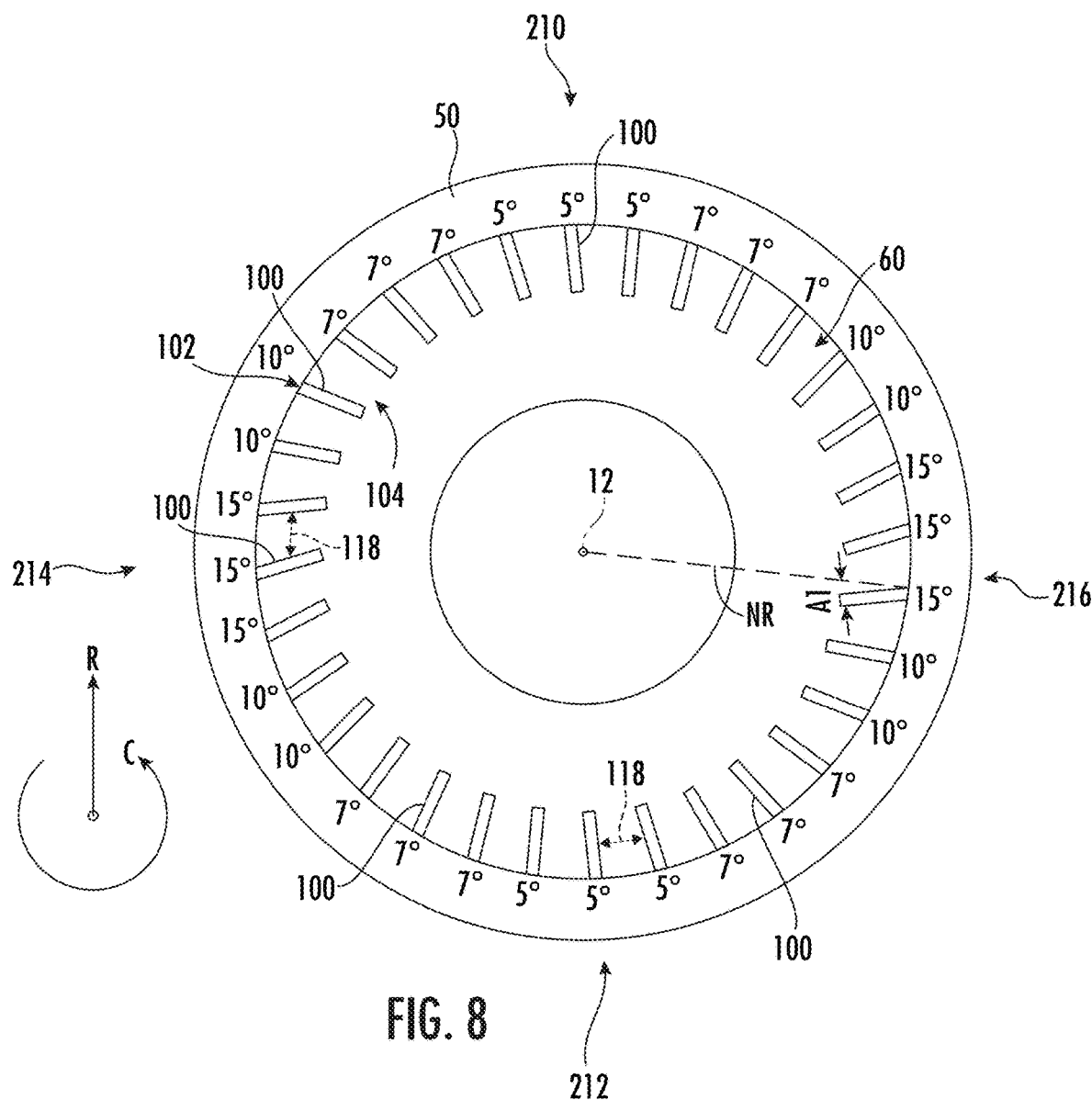
FIG. 8 is a schematic view of an inlet to the exemplary gas turbine engine of FIG. 1, along an axial direction of the gas turbine engine of FIG. 1 according to another exemplary embodiment of the present subject matter.

Referring now to FIG. 8, an axial view of the inlet 60 to the turbofan engine 10 of FIGS. 1 and 2, according to another exemplary embodiment, is provided. Referring to FIG. 8, in another exemplary embodiment, the plurality of part span inlet guide vanes 100 are angled at different first angles A1 with respect to the radius NR of the outer nacelle 50.

The outer nacelle 50 includes a top portion 210, a bottom portion 212, a first side portion 214, and a second side portion 216. In an exemplary embodiment, a first portion, e.g., the top portion 210, of the part span inlet guide vanes 100 are angled at a first angle A1 with respect to the radius NR of the outer nacelle 50. For example, the part span inlet guide vanes 100 are angled at a first angle A1 of five degrees or seven degrees with respect to the radius NR of the outer nacelle 50 at the top portion 210. Furthermore, a second portion, e.g., the first side portion 214, of the part span inlet guide vanes 100 are angled at a different angle with respect to the radius NR of the outer nacelle 50. For example, the part span inlet guide vanes 100 are angled at a first angle A1 of ten degrees or fifteen degrees with respect to the radius NR of the outer nacelle 50 at the first side portion 214. In such exemplary embodiments, the plurality of part span inlet guide vanes 100 are angled at different first angles A1 with respect to the radius NR of the outer nacelle 50 along the circumferential direction C.

In such an exemplary embodiment, circumferential variation in the angle of tilt, e.g., the first angle A1 with respect to the radius NR of the outer nacelle 50, can address many issues including cross winds, high angle of attack maneuvers such as takeoff, and engine installation on one side of an aircraft or another. For example, cross winds are more likely to affect the 3 or 9 o'clock positions on the engine, e.g., the second side portion 216 and the first side portion 214, which may make a different angle of tilt more desirable at the 3/9 o'clock positions than at the 6/12 o'clock positions on the engine, e.g., the bottom portion 212 and the top portion 210. In addition, installation on one side of the aircraft or the other may make cross wind effects more pronounced on the side of the engine that is further from the fuselage. Likewise, a high angle of attack may make differing tilt angles at the 6/12 o'clock positions desirable, e.g., the bottom portion 212 and the top portion 210. For these reasons, it is contemplated that the first angles A1 with respect to the radius NR of the outer nacelle 50 may vary for a particular application and may be different at the top portion 210, the bottom portion 212, the first side portion 214, and/or the second side portion 216 of the outer nacelle 50.

Figure 9:
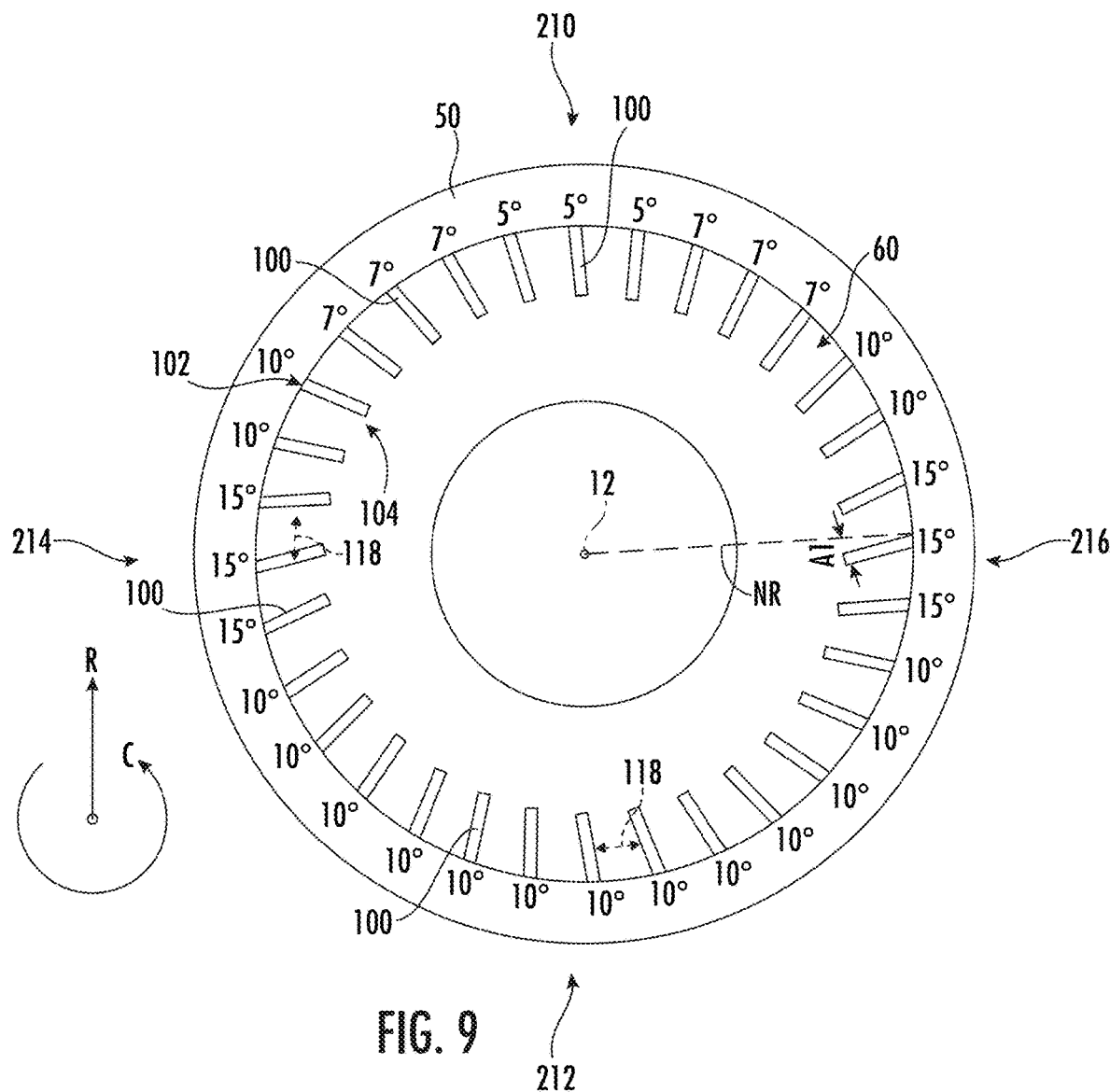
FIG. 9 is a schematic view of an inlet to the exemplary gas turbine engine of FIG. 1, along an axial direction of the gas turbine engine of FIG. 1 according to another exemplary embodiment of the present subject matter.

Referring now to FIG. 9, an axial view of the inlet 60 to the turbofan engine 10 of FIGS. 1 and 2, according to another exemplary embodiment, is provided. Referring to FIG. 9, in another exemplary embodiment, the plurality of part span inlet guide vanes 100 are angled at different first angles A1 with respect to the radius NR of the outer nacelle 50.

The outer nacelle 50 includes a top portion 210, a bottom portion 212, a first side portion 214, and a second side portion 216. In an exemplary embodiment, the part span inlet guide vanes 100 are angled at different first angles A1 with respect to the radius NR of the outer nacelle 50 at the top portion 210 and the bottom portion 212. For example, the top portion 210 of the part span inlet guide vanes 100 are angled at a first angle A1 with respect to the radius NR of the outer nacelle 50. For example, the part span inlet guide vanes 100 are angled at a first angle A1 of five degrees or seven degrees with respect to the radius NR of the outer nacelle 50 at the top portion 210. Furthermore, the bottom portion 212 of the part span inlet guide vanes 100 are angled at a different angle with respect to the radius NR of the outer nacelle 50. For example, the part span inlet guide vanes 100 are angled at a first angle A1 of ten degrees with respect to the radius NR of the outer nacelle 50 at the bottom portion 212. In such exemplary embodiments, the plurality of part span inlet guide vanes 100 are angled at different first angles A1 with respect to the radius NR of the outer nacelle 50 at the top portion 210 and the bottom portion 212.

In such an exemplary embodiment, circumferential variation in the angle of tilt, e.g., the first angle A1 with respect to the radius NR of the outer nacelle 50, can address many issues including cross winds, high angle of attack maneuvers such as takeoff, and engine installation on one side of an aircraft or another. For example, cross winds are more likely to affect the 3 or 9 o'clock positions on the engine, e.g., the second side portion 216 and the first side portion 214, which may make a different angle of tilt more desirable at the 3/9 o'clock positions than at the 6/12 o'clock positions on the engine, e.g., the bottom portion 212 and the top portion 210. In addition, installation on one side of the aircraft or the other may make cross wind effects more pronounced on the side of the engine that is further from the fuselage. Likewise, a high angle of attack may make differing tilt angles at the 6/12 o'clock positions desirable, e.g., the bottom portion 212 and the top portion 210. For these reasons, it is contemplated that the first angles A1 with respect to the radius NR of the outer nacelle 50 may vary for a particular application and may be different at the top portion 210, the bottom portion 212, the first side portion 214, and/or the second side portion 216 of the outer nacelle 50.

Figure 10:
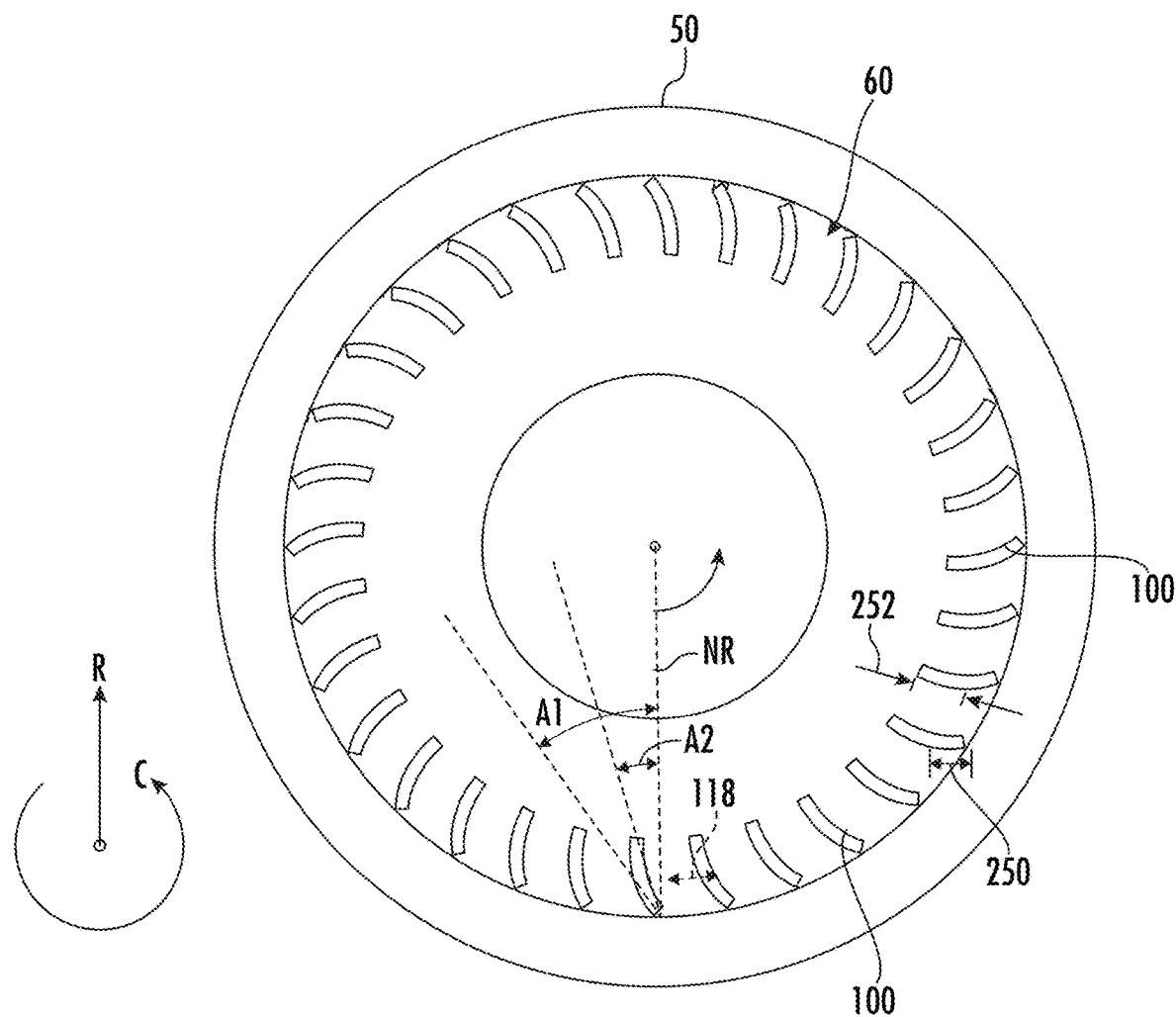
FIG. 10 is a schematic view of an inlet to the exemplary gas turbine engine of FIG. 1, along an axial direction of the gas turbine engine of FIG. 1 according to another exemplary embodiment of the present subject matter.

Referring now to FIG. 10, an axial view of the inlet 60 to the turbofan engine 10 of FIGS. 1 and 2, according to another exemplary embodiment, is provided. Referring to FIG. 10, in another exemplary embodiment, one of the part span inlet guide vanes 100 are angled at different angles with respect to the radius NR of the outer nacelle 50 at different portions of the part span inlet guide vane 100.

For example, the part span inlet guide vane 100 is angled at a first angle A1 with respect to the radius NR of the outer nacelle 50 a first location 250 of the part span inlet guide vane 100 and the part span inlet guide vane 100 is angled at a second angle A2 with respect to the radius NR of the outer nacelle 50 at a second location 252 of the part span inlet guide vane 100. In such an embodiment, the first angle A1 is different than the second angle A2. For example, in the embodiment depicted in FIG. 10, the first angle A1 is greater than the second angle A2.

In such an exemplary embodiment, varying the angle of tilt, e.g., the first angle A1 and the second angle A2, from the base of the part span inlet guide vane 100, e.g., the outer end 102 (FIG. 2), to the tip of the part span inlet guide vane 100, e.g., the inner end 104 (FIG. 2), can address varying levels of turbulence due to boundary layer effects, as you get closer to/further from the wall 52 (FIG. 2) of the outer nacelle 50. The angle of tilt and sweep may also be used to improve the matching of the swirl that is imparted to the incoming air with the varying linear speed of the fan blade 40 (FIG. 2) as you get closer to/further from the axis 12 (FIG. 1) of the engine 10. The linear speed of the fan blade 40 (FIG. 2) is greatest at the tip, and slowest at the root of the fan blade 40 (FIG. 2), even though the rotational velocity is equal.

Figure 11:
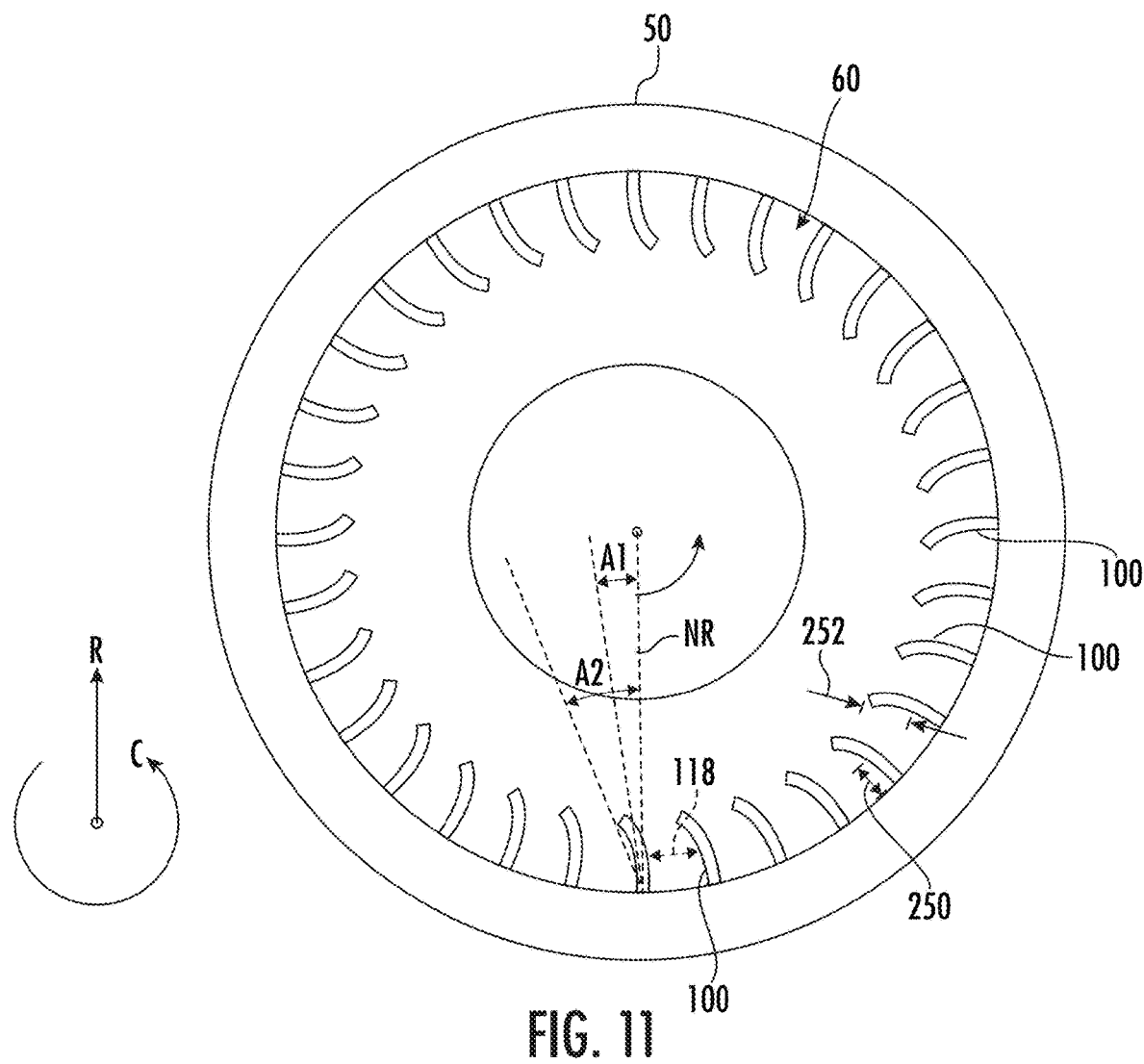
FIG. 11 is a schematic view of an inlet to the exemplary gas turbine engine of FIG. 1, along an axial direction of the gas turbine engine of FIG. 1 according to another exemplary embodiment of the present subject matter.

Referring now to FIG. 11, an axial view of the inlet 60 to the turbofan engine 10 of FIGS. 1 and 2, according to another exemplary embodiment, is provided. Referring to FIG. 11, in another exemplary embodiment, one of the part span inlet guide vanes 100 are angled at different angles with respect to the radius NR of the outer nacelle 50 at different locations of the part span inlet guide vane 100.

For example, the part span inlet guide vane 100 is angled at a first angle A1 with respect to the radius NR of the outer nacelle 50 a first location 250 of the part span inlet guide vane 100 and the part span inlet guide vane 100 is angled at a second angle A2 with respect to the radius NR of the outer nacelle 50 at a second location 252 of the part span inlet guide vane 100. In such an embodiment, the first angle A1 is different than the second angle A2. For example, in the embodiment depicted in FIG. 11, the first angle A1 is less than the second angle A2.

In such an exemplary embodiment, varying the angle of tilt, e.g., the first angle A1 and the second angle A2, from the base of the part span inlet guide vane 100, e.g., the outer end 102 (FIG. 2), to the tip of the part span inlet guide vane 100, e.g., the inner end 104 (FIG. 2), can address varying levels of turbulence due to boundary layer effects, as you get closer to/further from the wall 52 (FIG. 2) of the outer nacelle 50. The angle of tilt and sweep may also be used to improve the matching of the swirl that is imparted to the incoming air with the varying linear speed of the fan blade 40 (FIG. 2) as you get closer to/further from the axis 12 (FIG. 1) of the engine 10. The linear speed of the fan blade 40 (FIG. 2) is greatest at the tip, and slowest at the root of the fan blade 40 (FIG. 2), even though the rotational velocity is equal.

Further aspects of the disclosure are provided by the subject matter of the following clauses:

A turbofan engine comprising: a fan comprising a plurality of fan blades; a turbomachine operably coupled to the fan for driving the fan, the turbomachine comprising a compressor section, a combustion section, and a turbine section in serial flow order and together defining a core air flowpath; a nacelle surrounding and at least partially enclosing the fan, the nacelle defining a radius and a longitudinal axis; and an inlet pre-swirl vane located upstream of the plurality of fan blades and defining a chord, the inlet pre-swirl vane coupled to the nacelle, wherein the inlet pre-swirl vane is angled at a first angle with respect to the radius of the nacelle, and wherein the chord of the inlet pre-swirl vane is angled at a second angle with respect to the longitudinal axis of the nacelle.

The turbofan engine of any preceding clause, wherein the inlet pre-swirl vane is angled at the first angle with respect to the radius of the nacelle in a clockwise direction from an inlet of the nacelle.

The turbofan engine of any preceding clause, wherein the inlet pre-swirl vane is angled at the first angle with respect to the radius of the nacelle in a counterclockwise direction from an inlet of the nacelle.

The turbofan engine of any preceding clause, wherein the first angle is between approximately 2 degrees and approximately 45 degrees.

The turbofan engine of any preceding clause, wherein the second angle is between approximately 5 degrees and approximately 35 degrees.

The turbofan engine of any preceding clause, wherein the inlet pre-swirl vane is one of a plurality of part span inlet guide vanes extending from the nacelle upstream of the plurality of fan blades and aft of an inlet of the nacelle.

The turbofan engine of any preceding clause, wherein each of the plurality of part span inlet guide vanes is angled at the same first angle with respect to the radius of the nacelle.

The turbofan engine of any preceding clause, wherein a first portion of each of the plurality of part span inlet guide vanes is angled at the first angle with respect to the radius of the nacelle, wherein a second portion of each of the plurality of part span inlet guide vanes is angled at a third angle with respect to the radius of the nacelle, and wherein the first angle is different than the third angle.

The turbofan engine of any preceding clause, wherein the nacelle includes a top portion, a bottom portion, a first side portion, and a second side portion, wherein a first portion of each of the plurality of part span inlet guide vanes is angled at the first angle with respect to the radius of the nacelle at the top portion, wherein a second portion of each of the plurality of part span inlet guide vanes is angled at a third angle with respect to the radius of the nacelle at the bottom portion, and wherein the first angle is different than the third angle.

A nacelle assembly for a turbofan engine, the turbofan engine comprising a fan including a plurality of fan blades, the nacelle assembly comprising: a nacelle surrounding and at least partially enclosing the fan, the nacelle defining a radius and a longitudinal axis; and an inlet pre-swirl vane located upstream of the plurality of fan blades and defining a chord, the inlet pre-swirl vane coupled to the nacelle, wherein the inlet pre-swirl vane is angled at a first angle with respect to the radius of the nacelle, and wherein the chord of the inlet pre-swirl vane is angled at a second angle with respect to the longitudinal axis of the nacelle.

The nacelle assembly of any preceding clause, wherein the inlet pre-swirl vane is angled at the first angle with respect to the radius of the nacelle in a clockwise direction from an inlet of the nacelle.

The nacelle assembly of any preceding clause, wherein the inlet pre-swirl vane is angled at the first angle with respect to the radius of the nacelle in a counterclockwise direction from an inlet of the nacelle.

The nacelle assembly of any preceding clause, wherein the first angle is between approximately 2 degrees and approximately 45 degrees.

The nacelle assembly of any preceding clause, wherein the second angle is between approximately 5 degrees and approximately 35 degrees.

The nacelle assembly of any preceding clause, wherein the inlet pre-swirl vane is one of a plurality of part span inlet guide vanes extending from the nacelle upstream of the plurality of fan blades and aft of an inlet of the nacelle.

The nacelle assembly of any preceding clause, wherein each of the plurality of part span inlet guide vanes is angled at the same first angle with respect to the radius of the nacelle.

The nacelle assembly of any preceding clause, wherein a first portion of each of the plurality of part span inlet guide vanes is angled at the first angle with respect to the radius of the nacelle, wherein a second portion of each of the plurality of part span inlet guide vanes is angled at a third angle with respect to the radius of the nacelle, and wherein the first angle is different than the third angle.

The nacelle assembly of any preceding clause, wherein the nacelle includes a top portion, a bottom portion, a first side portion, and a second side portion, wherein a first portion of each of the plurality of part span inlet guide vanes is angled at the first angle with respect to the radius of the nacelle at the top portion, wherein a second portion of each of the plurality of part span inlet guide vanes is angled at a third angle with respect to the radius of the nacelle at the bottom portion, and wherein the first angle is different than the third angle.

A nacelle assembly for a turbofan engine, the turbofan engine comprising a fan including a plurality of fan blades, the nacelle assembly comprising: a nacelle surrounding and at least partially enclosing the fan, the nacelle defining a radius; and an inlet pre-swirl vane located upstream of the plurality of fan blades, the inlet pre-swirl vane coupled to the nacelle, wherein the inlet pre-swirl vane is angled at a first angle with respect to the radius of the nacelle at a first location of the inlet pre-swirl vane, wherein the inlet pre-swirl vane is angled at a second angle with respect to the radius of the nacelle at a second location of the inlet pre-swirl vane, and wherein the first angle is different than the second angle.

The nacelle assembly of any preceding clause, wherein the nacelle defines a longitudinal axis, wherein the inlet pre-swirl vane defines a chord, and wherein the chord of the inlet pre-swirl vane is angled at a third angle with respect to the longitudinal axis of the nacelle.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbofan engine comprising:
    a fan comprising a plurality of fan blades;
    a turbomachine operably coupled to the fan for driving the fan, the turbomachine comprising a compressor section, a combustion section, and a turbine section in serial flow order and together defining a core air flowpath;
    a nacelle surrounding and at least partially enclosing the fan, the nacelle defining a radius and a longitudinal axis; and
    an inlet pre-swirl vane located upstream of the plurality of fan blades and defining a chord, the inlet pre-swirl vane coupled to the nacelle, wherein the inlet pre-swirl vane is angled at a first angle with respect to the radius of the nacelle, and wherein the chord of the inlet pre-swirl vane is angled at a second angle with respect to the longitudinal axis of the nacelle, wherein the inlet pre-swirl vane is one of a plurality of part span inlet guide vanes extending from the nacelle upstream of the plurality of fan blades and aft of an inlet of the nacelle, wherein the plurality of part span inlet guide vanes includes a first portion and a second portion, wherein the first portion of the plurality of part span inlet guide vanes are angled at the first angle with respect to the radius of the nacelle, and wherein the second portion of the plurality of part span inlet guide vanes are angled at a third angle with respect to the radius of the nacelle, wherein the first angle is different than the third angle.

2. The turbofan engine of claim 1, wherein the inlet pre-swirl vane is angled at the first angle with respect to the radius of the nacelle in a clockwise direction from an inlet of the nacelle.

3. The turbofan engine of claim 1, wherein the inlet pre-swirl vane is angled at the first angle with respect to the radius of the nacelle in a counterclockwise direction from an inlet of the nacelle.

4. The turbofan engine of claim 1, wherein the first angle is variable between approximately 2 degrees and approximately 45 degrees.

5. The turbofan engine of claim 1, wherein the second angle is variable between approximately 5 degrees and approximately 35 degrees.

6. The turbofan engine of claim 1, wherein the first angle, the second angle, and the third angle are variable.

7. The turbofan engine of claim 1, wherein the inlet pre-swirl vane includes an outer end and an inner end, wherein the inner end is radially inward from the outer end, and wherein the second angle of the chord at the outer end is greater than the second angle of the chord at the inner end.

8. The turbofan engine of claim 1, wherein the inlet pre-swirl vane includes an outer end and an inner end, wherein the inner end is radially inward from the outer end, and wherein the second angle of the chord increases from the inner end to the outer end.

9. The turbofan engine of claim 1, wherein the first portion is one of a top portion, a bottom portion, a first side portion, or a second side portion.

10. The turbofan engine of claim 9, wherein the second portion is another of the top portion, the bottom portion, the first side portion, or the second side portion.

11. A nacelle assembly for a turbofan engine, the turbofan engine comprising a fan including a plurality of fan blades, the nacelle assembly comprising:
a nacelle surrounding and at least partially enclosing the fan, the nacelle defining a radius and a longitudinal axis; and
an inlet pre-swirl vane located upstream of the plurality of fan blades and defining a chord, the inlet pre-swirl vane coupled to the nacelle, wherein the inlet pre-swirl vane is one of a plurality of part span inlet guide vanes extending from the nacelle upstream of the plurality of fan blades and aft of an inlet of the nacelle,
wherein a first portion of the plurality of part span inlet guide vanes are angled at the first angle with respect to the radius of the nacelle, and wherein a second portion of the plurality of part span inlet guide vanes are angled at a third angle with respect to the radius of the nacelle, wherein the first angle is different than the third angle, and
wherein the chord of the inlet pre-swirl vane is angled at a second angle with respect to the longitudinal axis of the nacelle.

12. The nacelle assembly of claim 11, wherein the inlet pre-swirl vane is angled at the first angle with respect to the radius of the nacelle in a clockwise direction from an inlet of the nacelle.

13. The nacelle assembly of claim 11, wherein the inlet pre-swirl vane is angled at the first angle with respect to the radius of the nacelle in a counterclockwise direction from an inlet of the nacelle.

14. The nacelle assembly of claim 11, wherein the first angle is variable between approximately 2 degrees and approximately 45 degrees.

15. The nacelle assembly of claim 11, wherein the second angle is variable between approximately 5 degrees and approximately 35 degrees.

16. The nacelle assembly of claim 11, wherein the first angle, the second angle, and the third angle are variable.

17. The nacelle assembly of claim 11, wherein the first angle is either 5 degrees or 7 degrees.

18. The nacelle assembly of claim 17, wherein the third angle is either 10 degrees or 15 degrees.

19. The nacelle assembly of claim 11, wherein the first portion is one of a top portion, a bottom portion, a first side portion, or a second side portion, and wherein the second portion is another of the top portion, the bottom portion, the first side portion, or the second side portion.

20. A turbofan engine comprising:
a fan comprising a plurality of fan blades;
a turbomachine operably coupled to the fan for driving the fan, the turbomachine comprising a compressor section, a combustion section, and a turbine section in serial flow order and together defining a core air flowpath;
a nacelle surrounding and at least partially enclosing the fan, the nacelle defining a radius and a longitudinal axis; and
a plurality of part span inlet guide vanes extending from the nacelle upstream of the plurality of fan blades and aft of an inlet of the nacelle, wherein the plurality of part span inlet guide vanes includes a first portion and a second portion, wherein the first portion of the plurality of part span inlet guide vanes are angled at a first angle with respect to the radius of the nacelle, and wherein the second portion of the plurality of part span inlet guide vanes are angled at a third angle with respect to the radius of the nacelle, wherein the first angle is different than the third angle.

* * * * *